UNITED STATES PATENT OFFICE.

WILLIAM E. GREENAWALT, OF DENVER, COLORADO.

PROCESS OF EXTRACTING METALS FROM THEIR ORES.

968,845.     Specification of Letters Patent.     Patented Aug. 30, 1910.

No Drawing.     Application filed April 20, 1905. Serial No. 256,667.

*To all whom it may concern:*

Be it known that I, WILLIAM E. GREENAWALT, a citizen of the United States, residing at Denver, in the county of Denver and State of Colorado, have invented certain new and useful Improvements in Processes of Extracting Metals from Their Ores, of which the following is a specification.

My invention relates to improvements in processes of extracting metals from their ores.

It relates more particularly to copper ores and to ores containing copper with variable quantities of gold and silver.

Most copper ores contain more or less gold and silver. The difficulty with such ores has always been, that processes adapted to the extraction of the copper are not capable of extracting the gold and silver; and processes which are adapted to the extraction of gold and silver are not capable of profitably extracting the copper.

My object in this invention is to profitably extract all of these metals in one continuous operation.

Both sulfuric and hydrochloric acids act readily on copper in some of its various combinations; but these acids have no effect on gold or silver. Chlorin acts readily on gold and silver, and also on the various combinations of copper; but when used in the way ordinarily applied to the reduction of gold ores, it is too expensive for the extraction of copper. Sulfur dioxid precipitates gold, silver and copper from chlorid solutions. The gold is precipitated in its metallic form, silver as the sulfid, and copper as the cuprous chlorid. Sulfur dioxid combines with chlorin, in the presence of water, to form sulfuric and hydrochloric acids. This is the first step in my process. The next step is to add an excess of chlorin to the acid solution to extract the gold.

Sulfur dioxid can, ordinarily, be cheaply obtained in mining districts from pyrites, which usually occurs in abundance. By combining the chlorin with sulfur dioxid, two atoms of copper can be extracted where only one atom is possible when the chlorin is used direct. This may be shown by the following reactions:

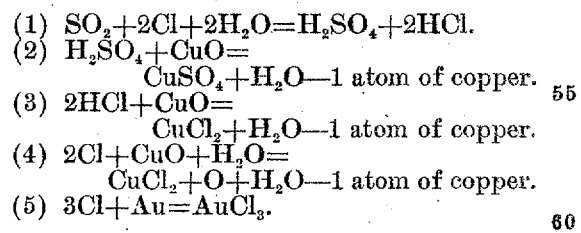

(1) $SO_2 + 2Cl + 2H_2O = H_2SO_4 + 2HCl$.
(2) $H_2SO_4 + CuO = CuSO_4 + H_2O$—1 atom of copper.
(3) $2HCl + CuO = CuCl_2 + H_2O$—1 atom of copper.
(4) $2Cl + CuO + H_2O = CuCl_2 + O + H_2O$—1 atom of copper.
(5) $3Cl + Au = AuCl_3$.

Cupric chlorid, when warm and in the presence of base metal chlorids, acts readily on silver and its compounds to form silver chlorid.

(6) $Ag + CuCl_2 = AgCl + CuCl$.

From 75 to 80% of the silver may in this way be extracted with the copper, even when the ore is given an oxidizing roast. If the ore contains considerable silver it is desirable to leach with a fairly concentrated solution of base metal chlorids. A concentrated solution of sodium chlorid is preferred for this purpose.

The solubility of chlorin in water is limited. If a certain small amount is exceeded, the cheap handling of the ore and solution in open vat, leaching is almost impossible. By the indirect method of combining the chlorin and sulfur dioxid to form acids, any desired strength of acid solution may be obtained for the copper, and a solution of chlorin of sufficient strength for the gold.

The dissolved copper is precipitated thus—

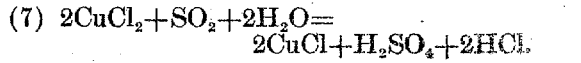

(7) $2CuCl_2 + SO_2 + 2H_2O = 2CuCl + H_2SO_4 + 2HCl$.

The gold and silver thus—

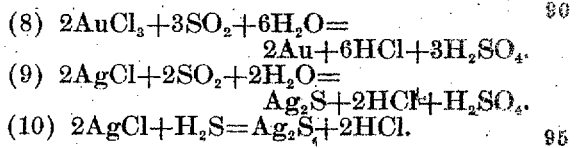

(8) $2AuCl_3 + 3SO_2 + 6H_2O = 2Au + 6HCl + 3H_2SO_4$.
(9) $2AgCl + 2SO_2 + 2H_2O = Ag_2S + 2HCl + H_2SO_4$.
(10) $2AgCl + H_2S = Ag_2S + 2HCl$.

The hydrogen sulfid as used in equation 10 is preferably generated by the action of dilute sulfuric or hydrochloric acid as obtained by equation 1, on iron sulfid.

The sulfuric and hydrochloric acids are regenerated while the cupric chlorid is converted into cuprous chlorid and precipitated. The cuprous chlorid is then separated from the solution, and preferably decomposed by the electric current. By electrolysis, native copper is deposited at the cathode while chlorin and hydrochloric acid are produced at the anode; these are again added to the solvent to dissolve more copper.

The cuprous chlorid, before subjecting it to electrolysis, is melted at a low red heat and cast into anodes. While it is still molten, suitable electrical connections are made for the current. These anodes, while practically insoluble in water, are sufficiently soluble in brine or dilute hydrochloric acid to give good results. The anolyte, charged with chlorin and hydrochloric acid, is continuously added to the solvent of the metals.

In precipitating with $SO_2$ only the copper in its chlorid combinations is precipitated as the insoluble cuprous chlorid. The extra atom of copper as $CuSO_4$ has not yet been precipitated. Ordinarily it will not remain in the form of sulfate, but will be converted into the chlorid by the chlorin, hydrochloric acid, and base metal chlorids. If, for example, there is lime in the ore, as there usually is, both the sulfuric and hydrochloric acids may combine with it. If the hydrochloric acid combines with the lime, the result will be the formation of calcium chlorid ($CaCl_2$), but the calcium chlorid will at once react with the copper sulfate in the solution and convert it into the cupric chlorid.

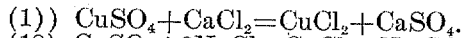
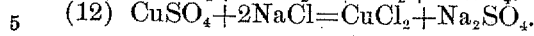

(1)) $CuSO_4 + CaCl_2 = CuCl_2 + CaSO_4$.
(12) $CuSO_4 + 2NaCl = CuCl_2 + Na_2SO_4$.

It is evident therefore, that the sulfuric acid is the one which is eliminated by reacting with the base elements. The base metal chlorids act as a solvent for the silver chlorid.

It is desirable in precipitating, to use an excess of sulfur dioxid. This excess, on coming in contact with the chlorin produced in the electrolytic cells, produces hydrochloric and sulfuric acids as shown in equation (1); and, with the precipitation, regenerates the solution.

There should be free chlorin in the solution for the precious metals. Enough should, therefore, be provided to combine with the sulfur dioxid and leave an excess. This excess will immediately act on the gold as soon as the copper in the ore is sufficiently exhausted. Since the cupric chlorid which is always present, acts as an efficient chloridizer of the silver, chloridizing roasting may be dispensed with if the silver value in the ore is not too large.

It is desirable, also, that there should be an excess of base metal chlorids in the solution so that any copper sulfates formed, will be converted into the chlorid at the expense of the base metal chlorids, rather than at the expense of the free chlorin and hydrochloric acid. Salt (NaCl) is conveniently used for this purpose.

Sulfur dioxid has been chosen as the reagent which best fulfils the function of precipitation and regeneration; it is evident however that other reagents may be used to advantage.

Heretofore, when sulfur dioxid has been used as the precipitant for copper, it was necessary to expel the excess of precipitant before again applying the solution to the ore, since a solvent and precipitant of a metal in the same solution is incompatible with the extraction of the metal. Sulfur dioxid is quite soluble in water; at ordinary temperatures about 10%. The expulsion of the gas is not an easy matter. In my process, what was formerly considered a disadvantage, is turned into a decided advantage, since by combining the sulfur dioxid with chlorin, the precipitant renders its equivalent as a solvent.

In electrolyzing the precipitated cuprous chlorid, there is a tendency to reconvert some of the cuprous chlorid into the cupric chlorid, and to release free chlorin. To avoid this it is desirable to use a reducing agent in the electrolyte. Sulfur dioxid is well adapted for this purpose, since by its use, the chlorin is converted into acid according to equation (1) and any tendency to form the cupric chlorid would be immediately obviated according to equation (7). Hydrogen sulfid also answers the same purpose very well.

Having thus described my invention what I claim is.

1. A process comprising combining free chlorin with sulfur dioxid in the presence of water, then treating ores of copper with the solution so formed.

2. A process comprising combining chlorin with sulfur dioxid in the presence of water; dissolving metals from ores with the acid solution so formed; treating the solution with sulfur dioxid to precipitate the dissolved metals therefrom, and then regenerating the solution with chlorin.

3. A process comprising combining chlorin with sulfur dioxid in the presence of water;

dissolving metals from their ores with the acid solution so formed; treating the solution with a precipitant capable of replacing the metal with hydrogen to precipitate the dissolved metals therefrom, and combining the excess of precipitant with chlorin to convert it into acid capable of acting on the metals in the ore.

4. A process comprising combining chlorin with sulfur dioxid in the presence of water; treating ores containing copper and gold with the acid solution so formed; precipitating the copper with sulfur dioxid; converting the excess of sulfur dioxid into acid by bringing it in contact with chlorin, and then adding chlorin in excess to dissolve the gold.

5. A process comprising combining chlorin with sulfur dioxid in the presence of water; treating ores of metals with the acid solution so formed to dissolve the metals soluble in an acid solution; treating the solution with sulfur dioxid to precipitate the dissolved metals therefrom; converting the excess of sulfur dioxid into acid by bringing it in contact with chlorin, and then adding chlorin in excess to dissolve the metals not soluble in acid solution.

6. A process of extracting copper from its ores comprising combining chlorin with sulfur dioxid in the presence of water; treating the ore with the acid solution so formed; precipitating the copper as cuprous chlorid; fusing the precipitated cuprous chlorid and casting it into suitable anodes; then decomposing the fused anodes by electrolysis and thus obtaining metallic copper.

7. A process comprising combining chlorin with sulfur dioxid in the presence of water; treating ores of copper with the solution so formed; precipitating the copper as cuprous chlorid; electrolyzing the cuprous chlorid to convert it into metallic copper and chlorin, and then adding the chlorin so released to the solvent of the copper.

8. A process of extracting metals from their ores comprising combining sulfur dioxid with chlorin in the presence of water; dissolving metals from ores with the solution so formed; maintaining an excess of alkali metal chlorid in the solution; precipitating the dissolved metals with a precipitant capable of regenerating acid, and then applying chlorin to the regenerated acid solution.

9. A process comprising combining sulfur dioxid with chlorin in the presence of water to form an acid solution; treating ores of metals with the solution so formed; maintaining an excess of alkali metal chlorid in the solution; precipitating the dissolved metals with a precipitant capable of regenerating acid, and then applying chlorin to the precipitated solution in the presence of an excess of the precipitant.

10. A process comprising extracting copper from its ores; precipitating the dissolved copper as cuprous chlorid, and then electrolyzing the cuprous chlorid in the presence of sulfur dioxid.

11. A process of extracting copper from its various combinations comprising dissolving the copper; precipitating it as cuprous chlorid, and then electrolyzing the cuprous chlorid in the presence of a substance capable of preventing the formation of cupric chlorid and the liberation of free chlorin.

12. A process comprising electrolyzing cupric chlorid in the presence of a substance capable of preventing the formation of cupric chlorid.

13. A process comprising electrolyzing copper in its chlorid combinations in the presence of sulfur dioxid.

14. A process comprising combining chlorin with sulfur dioxid in the presence of water to form an acid solution; treating ore of copper with the solution so formed; precipitating the dissolved copper as cuprous chlorid with sulfur dioxid; electrolyzing the precipitated cuprous chlorid in the presence of sulfur dioxid, and then adding the resulting acid solution to the solvent of the copper.

15. A process comprising electrolyzing a chlorid to generate chlorin; roasting a metal sulfid to generate sulfur dioxid; combining the chlorin with the sulfur dioxid in the presence of water, and then dissolving metals from their ores with the acid solution so formed.

16. A process of extracting metals from their ores which consists in electrolyzing a chlorid to generate chlorin; combining the chlorin so generated with sulfur dioxid in the presence of water; and then dissolving metals from their ores with the acid solution so formed.

17. A process of extracting copper from its ores which consists in treating the ore with an acid chlorid solution; converting the dissolved copper into cuprous chlorid by means of sulfur dioxid; and then electrolyzing the cuprous chlorid in the presence of sulfur dioxid and a metal chlorid other than the chlorids of copper.

WILLIAM E. GREENAWALT.

Witnesses:
CHARLES B. SCOTT,
MICHAEL GUINAN.

It is hereby certified that in Letters Patent No. 968,845, granted August 30, 1910, upon the application of William E. Greenawalt, of Denver, Colorado, for an improvement in "Processes of Extracting Metals from Their Ores," errors appear in the printed specification requiring correction as follows: Page 2, line 44, the characters "(1))" should read (*11*), and page 3, line 80, the word "cupric" should read *cuprous;* and that the said Letters Patent should be read with these corrections therein that the same may conform to the record of the case in the Patent Office.

Signed and sealed this 27th day of September, A. D., 1910.

[SEAL.]

C. C. BILLINGS,
*Acting Commissioner of Patents.*